United States Patent [19]

Kidd et al.

[11] Patent Number: 5,174,633
[45] Date of Patent: Dec. 29, 1992

[54] BEARING SUPPORT FOR WHEEL

[75] Inventors: Michael T. Kidd; Gerald L. Cline, both of Delton, Mich.

[73] Assignee: Standex International Corporation, Salem, N.H.

[21] Appl. No.: 689,696

[22] Filed: Apr. 19, 1991

[51] Int. Cl.⁵ .............................................. B60B 5/02
[52] U.S. Cl. .................................. 301/64.7; 301/105.1
[58] Field of Search .......... 301/63 PW, 105 R, 105 S, 301/124 R, 126, 131, 1; 384/296

[56] References Cited

U.S. PATENT DOCUMENTS

| 1,466,137 | 8/1923 | Mead | 384/296 X |
| 1,748,198 | 2/1930 | Van Wormer | 301/105 R X |
| 3,438,686 | 4/1969 | Stone | 384/296 |
| 4,153,303 | 5/1979 | Tanner | 301/63 DD X |
| 4,592,595 | 6/1986 | Freeman | 301/63 PW |
| 5,002,163 | 3/1991 | Kidd | 301/37 P X |
| 5,014,392 | 5/1991 | Melara | 384/296 X |

FOREIGN PATENT DOCUMENTS

| 3811757 | 10/1989 | Fed. Rep. of Germany | 301/111 |
| 3820580 | 10/1989 | Fed. Rep. of Germany | 301/124 R |
| 2110609 | 6/1983 | United Kingdom | 301/111 |

Primary Examiner—Russell D. Stormer
Attorney, Agent, or Firm—Flynn, Thiel, Boutell & Tanis

[57] ABSTRACT

A wheel assembly includes a tubular spindle having a central portion of reduced diameter defining at each axial end of the central portion an axially facing locking surface. Two annular bearing members encircle and are supported on the spindle on opposite sides of the reduced diameter central portion, each bearing member having at least one resilient locking member which projects axially toward the other bearing member and which has a shoulder engageable with a respective shoulder on the spindle. Each bearing member has at its axially outer end a radial projection which carries an axially inwardly facing annular surface. A wheel has a central axial opening, the spindle and bearing members being disposed within the opening and the radially outer surfaces of the bearing members engaging the central axial opening through the wheel. The wheel has at each end of the central opening an axially outwardly facing surface which engages the surface on the radial projection of a respective bearing member.

19 Claims, 2 Drawing Sheets

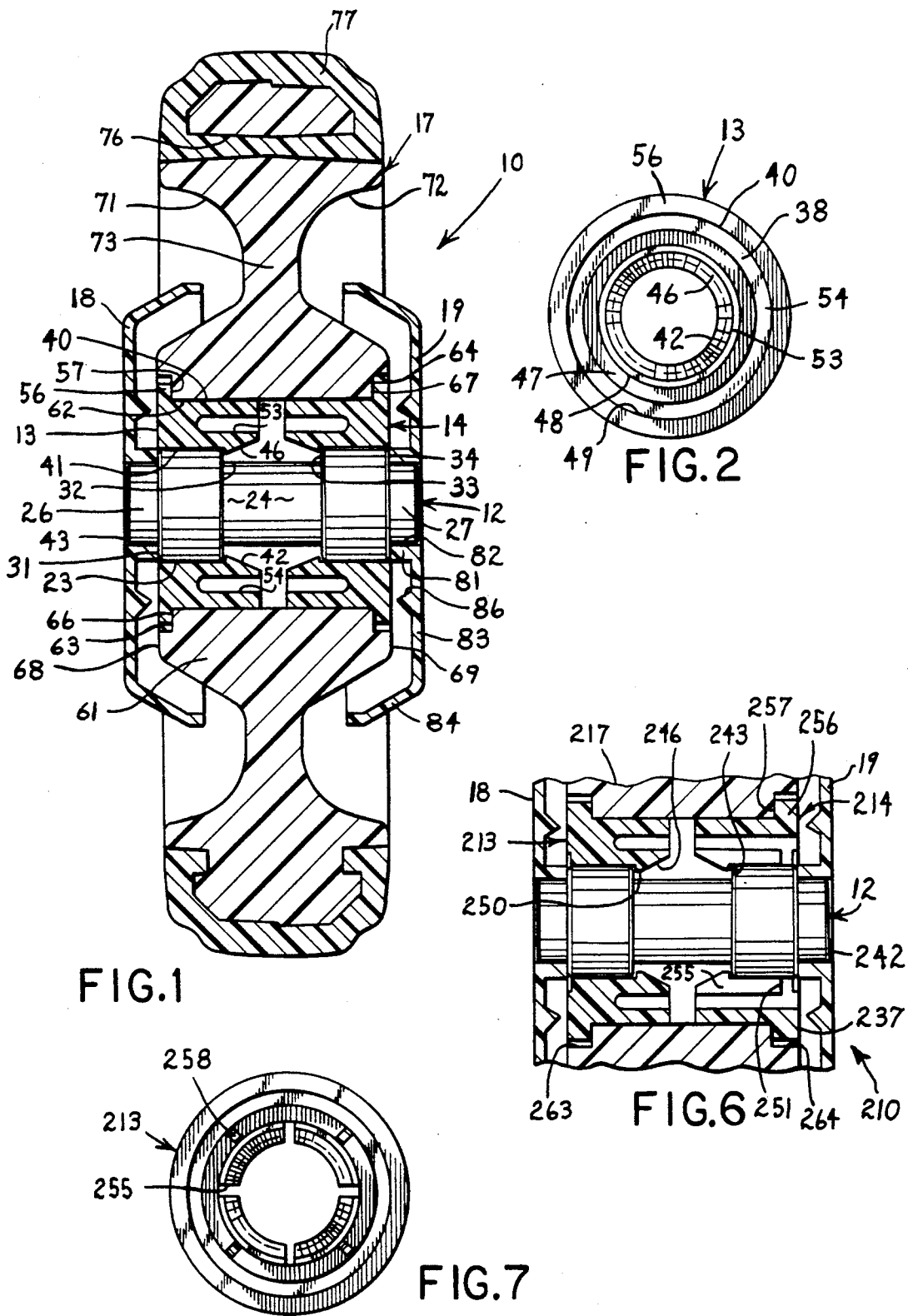

18 5,174,633

BEARING SUPPORT FOR WHEEL

FIELD OF THE INVENTION

This invention relates to a wheel assembly for use in a wheel bracket mechanism and, more particularly to a bearing support for such a wheel assembly.

BACKGROUND OF THE INVENTION

Grocery carts and similar hand-propelled vehicles are typically supported by several wheel bracket mechanisms which each include a wheel bracket with two spaced flanges, a tubular spindle disposed between the flanges, an axle extending through the spindle and having its ends supported on the flanges, a wheel having an annular hole, and at least one plastic bushing or bearing disposed in the space between the spindle and the central hole through the wheel.

In operational use, forces frequently urge the wheel axially relative to the axle. For example, forces of this type are very common when a number of grocery carts are "nested" and then the line of nested carts is pushed around a corner, because the rear wheel bracket mechanisms of each cart are normally not pivotal about a vertical axis and thus axial forces are exerted on the rear wheels as they are dragged over the ground while the line of carts is turned. In a wheel assembly of the type to which the invention relates, axial forces of this type have a tendency to cause the bearings to shift axially within the central opening in the wheel, and even to begin to work their way axially out of the central opening.

An object of the present invention is therefore to provide a wheel assembly of the type mentioned above, in which the bearings provided between the spindle and wheel do not tend to shift axially when axial forces are exerted on the wheel during normal operational use of the wheel assembly.

A further object of the invention is to provide such a wheel assembly which is structurally simple and is inexpensive to manufacture and assemble.

SUMMARY OF THE INVENTION

The objects and purposes of the invention, including those set forth above, are met by providing a wheel assembly which includes an axially elongate spindle having thereon a shoulder which faces in a first axial direction, an annular bearing member extending around and supported on the spindle at an axial location spaced in a second direction opposite the first direction from the shoulder, and a wheel having a central opening extending axially therethrough, the bearing extending within the central opening and the shoulder on the spindle being axially between first and second axial ends of the central opening, the bearing member engaging the wheel in the region of the first axial end of the central opening. The bearing member has a resilient locking projection extending therefrom in the first axial direction and having a shoulder which faces in the second axial direction and which is engageable with the shoulder on the spindle.

BRIEF DESCRIPTION OF THE DRAWINGS

Three preferred embodiments of the invention are described in detail hereinafter with reference to the accompanying drawings, in which:

FIG. 1 is a central sectional view of a wheel assembly embodying the present invention;

FIG. 2 is an end view of an annular bearing which is a component of the wheel assembly of FIG. 1;

FIG. 6 is a fragmentary central sectional view similar to FIG. 4 but showing a further alternative embodiment of the wheel assembly; and FIG. 7 is an axial end view of an annular bearing which is a component of the wheel assembly of FIG. 6.

DETAILED DESCRIPTION

Figure 3:
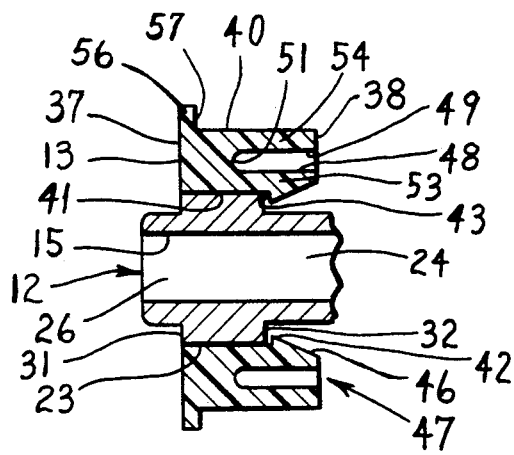
FIG. 3 is a central sectional view of a spindle and a bearing which are components of the wheel assembly of FIG. 1.

A first embodiment of the invention is shown in FIGS. 1-3, and is a wheel assembly 10 having a spindle 12 with a central axial opening 15 (FIG. 3), two annular bearings 13 and 14 which each encircle and are supported on the spindle 12, an annular wheel 17 which encircles and is supported on the bearings 13 and 14, and two threadguards 18 and 19 disposed on opposite axial sides of the wheel 17.

In an additional operational configuration, the wheel assembly 10 is normally disposed between two spaced metal flanges (not illustrated) of a conventional wheel bracket, and a conventional cylindrical metal axle (not illustrated) extends through the central axial opening 15 in the spindle 12 and through aligned openings in the two flanges, and has each end upset against the outer side of a respective flange. Since the bracket and axle are conventional and not a part of the present invention, they are not shown and described here.

The spindle 12 is preferably made of metal coated with a corrosion inhibitor, such as phosphated oil and, as mentioned above, is tubular and has the central cylindrical axial opening 15 extending its full length. The spindle 12 has a cylindrical outer surface 23, with a cylindrical central portion 24 of reduced diameter and cylindrical end portions 26 and 27 of reduced diameter. The reduced diameter portions define two axially outwardly facing annular shoulders 31 and 34, and two axially inwardly facing annular locking shoulders 32 and 33.

The annular bearings 13 and 14 are preferably made of a moldable synthetic resin material in the nature of a conventional hard plastic or a similar material, for example an acetal resin material commercially available from DuPont under the trademark DELRIN. The bearings 13 and 14 are identical, and therefore only the bearing 13 is described in detail.

Referring to FIGS. 1 and 3, the annular bearing 13 has axially facing end surfaces 37 and 38 at opposite ends thereof, has a cylindrical outer surface 40, and a cylindrical inner surface 41. An annular rib 42 projects radially inwardly from one end of the inner surface 41, and has on it an axially facing annular locking shoulder 43. The rib 42 also has on it a frustoconical surface 46 which diverges in diameter in an axial direction toward the end surface 38 of the bearing 13.

The bearing 13 also has an annular recess 47 which extends axially into it from the end surface 38 coaxially with and spaced radially from the cylindrical inner and outer surfaces 40 and 41. The recess 47 has facing cylindrical walls 48 and 49, and an inner end 51 which is located slightly less than half the axial distance from the shoulder 43 to the end surface 37. The annular recess 47 thus essentially divides the right end portion of the bearing member 13 in FIG. 3 into a resilient, axially projecting annular locking projection 53 having thereon the annular locking shoulder 43, and an axially projecting annular projection 54 which is radially spaced from and concentrically encircles the locking projection 53.

The bearing member 13 also has an annular flange 56 which projects radially outwardly beyond surface 41 adjacent the end surface 37, and which has thereon an axially facing annular surface 57. As shown in FIGS. 1 and 3, the bearings 13 and 14 each encircle the spindle 12 and have their cylindrical inner surfaces 41 disposed against the cylindrical outer surface 23 of spindle 12, the annular locking shoulders 43 on the bearing members 13 and 14 respectively engaging the locking shoulders 32 and 33 on the spindle 12 to prevent axially outward movement of either bearing member 13 or 14 relative to the spindle 12. Each of the bearing members 13 and 14 is a single integral part.

Referring to FIG. 1, the annular wheel 17 includes a main portion 61 which is made of a thermoplastic resin and has a central cylindrical opening 62 extending axially through it. At each end of the central opening 62 are respective radially outwardly extending annular recesses 63 and 64 of rectangular cross section, which have therein respective axially outwardly facing annular surfaces 66 and 67. As evident from FIG. 1, the inner surface of the central opening 62 through the wheel 17 engages the cylindrical outer surfaces 40 on the two annular bearings 13 and 14, the annular flanges 56 on the bearings 13 and 14 each being received in a respective one of the annular recesses 63 and 64, and the axially facing surface 57 on each flange 56 engages a respective one of the axially facing surfaces 66 and 67 on the wheel 17 in order to prevent axial movement in either direction of the annular wheel 17 relative to the bearings 13 and 14 and the spindle 12. The side surfaces 63 and 69 of the main portion 61 are approximately flush with the end surfaces 37 on the respective bearings 13 and 14.

The main portion 61 of wheel 17 has in each side surface thereof a respective annular recess 71 or 72, which together define a section 73 of reduced axial thickness. The main portion 61 also has several openings 76 extending axially through it at circumferentially spaced locations.

In addition to the main portion 61, the wheel 17 includes an annular tread 77 which is made of a thermoplastic resin, which encircles the main portion 61, and which has material disposed in each of the axial openings 76 through the main portion 61.

The threadguards 18 and 19 are made of plastic and are identical, and therefore only the threadguard 19 is described in detail. Referring to FIG. 1, the threadguard 19 has a cylindrical central portion 81 with a cylindrical central opening 82 through it, the end portion 27 of spindle 12 being snugly disposed within the opening 82, the left axial end of the portion 81 being disposed against shoulder 34 on spindle 12, and the right axial end extending a small axial distance beyond the end of the spindle 12. A planar side wall portion 83 of circular shape extends radially outwardly from the axially outer end of central portion 81, and an annular flange portion 84 provided at the radially outer end of the wall 83 is angled to extend axially inwardly and radially outwardly into the recess 72. At a point radially between the central portion 81 and flange portion 84, the wall portion 83 has on the axially inner side thereof an axially inwardly projecting annular rib 86. In the preferred embodiment, each threadguard is a single integral part.

Figure 4:
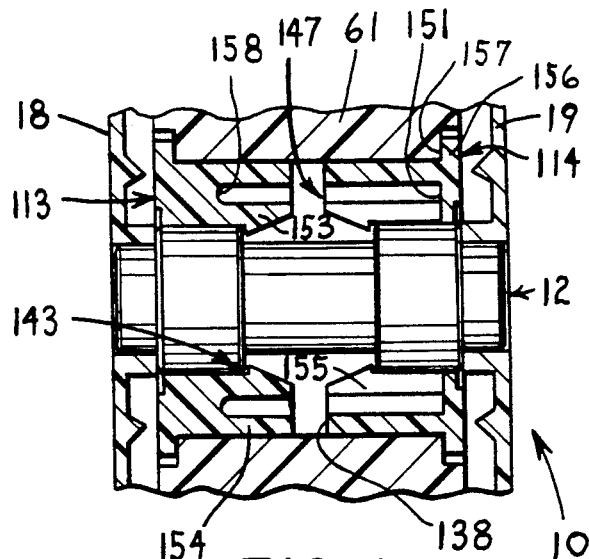
FIG. 4 is a fragmentary central sectional view similar to a portion of FIG. 1 but showing an alternative embodiment of the wheel assembly of FIG. 1.
Figure 5:
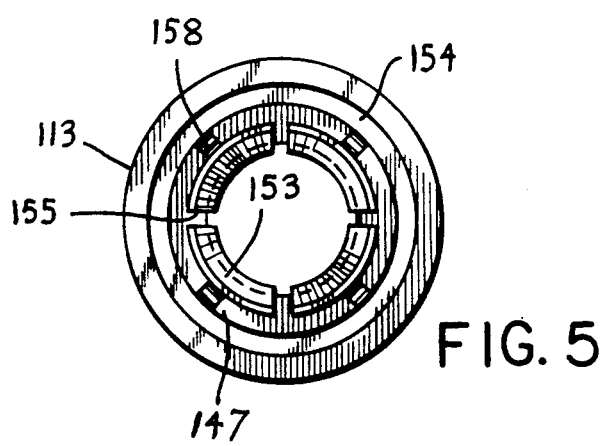
FIG. 5 is an axial end view of an annular bearing which is a component of the wheel assembly of FIG. 4.

Turning to the alternative embodiment shown in FIGS. 4 and 5, a wheel assembly 110 is depicted, and is identical to the wheel assembly 10 shown in FIG. 1, except that it includes bearing members 113 and 114 which are slightly different from the bearing members 13 and 14 of FIG. 1. Thus, the following discussion focuses on the bearing members 113 and 114. The bearing members 113 and 114 are identical, and in many respects are similar to the bearing members 13 and 14 of FIG. 1. Therefore, only the differences will be described in detail.

More specifically, and referring to FIGS. 4 and 5, the annular recess in each bearing member is deeper, and in particular has its inner end 151 positioned so as to be approximately coplanar with the annular surface 157 on the radially outwardly projecting flange 156. In addition, each bearing member lacks a single circumferentially continuous annular locking projection, but instead has four slots 155 which extend axially from the end surface 138 to the inner end 151 of the recess 147, thereby defining four circumferentially spaced axial locking projections 153. In addition, four ribs 158 are provided, each rib 158 extending radially from a respective locking projection 153 to the continuous annular axial outer projection 154, and extending axially from the inner end 151 of the recess 147 a little more than half the axial distance to the annular locking shoulder 143. The slots 155 are angularly offset from each other by 90° and the ribs 158 are also angularly offset from each other by 90°, the ribs 158 each being located angularly intermediate a respective pair of the slots 155, as evident from FIG. 5.

Referring now to the additional alternative embodiment shown in FIGS. 6 and 7, a wheel assembly 210 is depicted, and is identical to the wheel assembly 110 shown in FIG. 4, except that it includes bearing members 213 and 214 which are slightly different from the bearing members 113 and 114 of FIG. 4. Thus, the following discussion focuses on the bearing members 213 and 214, and in particular on the specific manner in which they differ from bearing members 113 and 114.

More specifically, and referring to FIGS. 6 and 7, each of the four slots 255 extends axially the full length of the bearing member, and in particular opens through the axially outwardly facing end surface 237 thereof. In addition, the radially outwardly projecting annular flange 256 has a greater axial thickness, and the corresponding annular recesses 263 and 264 in the wheel 217 have correspondingly increased axial dimensions. Thus, the inner end 251 of the annular recess is located axially between the axially facing surface 237 and the axially facing shoulder 257 provided on opposite sides of the flange 256. The rib 242 has at its radially inner end a radially inwardly facing cylindrical surface 250, which extends axially between the axially facing shoulder 243 and the frustoconical surface 246. Further, the thickness of the ribs 258 in a circumferential direction is less than that of the ribs 158 in the embodiment of FIGS. 4 and 5.

ASSEMBLY

With reference to FIG. 1, the wheel assembly 10 is assembled by taking the annular wheel 17, with the tread 77 already provided in a conventional manner on the main portion 61, and placing the spindle 12 coaxially in the center of the central opening 62 through the wheel 17. Then, the annular bearings 13 and 14 are pressed into place from opposite sides of the wheel, the frustoconical surface 46 on each causing the axial locking projection 53 to be flexed or distorted radially outwardly as the rib 142 moves across the cylindrical outer surface 23 of the spindle 12, the resilience of the annular locking projection 53 causing it to snap back to its original position as soon as the rib 42 reaches the central portion 24 of reduced diameter on the spindle 12. Thus, the locking shoulder 43 on each rib 42 is engaging one of the locking shoulders 32 and 33 on spindle 12, and the surface 57 on each bearing part will be engaging a respective one of the surfaces 66 and 67 on the wheel 17. Therefore, axial movement of the bearings 13 and 14 or the wheel 17 relative to each other or the spindle 12 is prevented. Then, the threadguards 18 and 19 are slid onto the end portions 26 and 27, there being a sufficient frictional fit so that they do not tend to fall off. This completes assembly of the wheel assembly 10 itself.

Thereafter, the wheel assembly 10 can optionally be placed between spaced flanges of a not-illustrated conventional wheel bracket so that the flanges are each disposed against the outer surface of a respective threadguard, a not-illustrated conventional cylindrical axle can be inserted through the central cylindrical opening 15 through the spindle 12 and through aligned openings in the flanges of the bracket, and then the ends of the axle can be upset against the outer sides of the flanges to complete the assembly of the overall wheel bracket. In use, the spindle 12 rotates around the stationary and not illustrated axle.

It will be recognized that conventional roller bearings could be provided in a conventional manner between the spindle 12 and the not-illustrated axle.

It will be noted that the bearings 13 and 14 are each solid and free of recesses at the axial outer end thereof, thereby providing solid support for the wheel 12 at each axial end of its opening 62, which effectively avoids wobbling of the annular wheel 17 relative to spindle 12.

The wheel assemblies 110 and 210 shown in FIGS. 4-7 are assembled in substantially the same manner as the wheel assembly 10 shown in FIGS. 1-3, and a detailed discussion thereof is thus believed unnecessary.

Three preferred embodiments of the present invention have been described in detail for illustrative purposes, but it will be recognized that variations or modifications of the disclosed embodiments, including the rearrangement of parts, lie within the scope of the appended claims.

The embodiments of the invention in which an exclusive property or privilege is claimed are defined as follows:

1. A wheel assembly, comprising:
   a wheel having means defining a central opening extending axially therethrough, said central opening having a radially inwardly facing surface;
   an axially elongate spindle extending coaxially through said central opening and having thereon a first shoulder which faces into said central opening in a first axial direction and being oriented axially inwardly of said central opening from first and second axial ends of said central opening, said spindle additionally having at a location spaced in said first axial direction from said first shoulder thereon a second shoulder which faces in a second axial direction opposite said first axial direction and opposing said first shoulder, said second shoulder being oriented axially between said second axial end of said central opening through said wheel and said first shoulder; and
   retainer means for retaining said wheel on said spindle, said retainer means including:
   a first annular bearing member extending around and supported on said spindle at an axial location spaced in said second axial direction from said first shoulder, said first bearing member extending within said central opening, a radially outwardly extending flange adjacent one axial end of said first bearing member and having a diameter greater than said central opening, said first bearing member further including means defining a radially outwardly facing surface of lesser diameter than the diameter of said radial flange, said radially outwardly facing surface engaging and supporting said radially inwardly facing surface of said opening in said wheel at least in the region of said first axial end of said central opening, said first bearing member having a first resilient locking projection extending axially from said one axial end thereof in said first axial direction into said central opening and having a third shoulder which faces axially outwardly of said central opening in said second axial direction and which is engageable with the opposing said first shoulder on said spindle to retain said first bearing member on said spindle, an axially inwardly facing side of said radially outwardly extending flange bearing against an axially outwardly facing side on said wheel to retain said wheel on said bearing member; and
   a second annular bearing member identical to said first bearing member and which extends around and is supported on said spindle at an axial location spaced in said first axial direction from said second shoulder, said second bearing member engaging said wheel in the region of said second axial end of said central opening and having a second resilient locking projection with a fourth shoulder which faces in said first axial direction and which is engageable with said shoulder on said spindle to retain said second bearing member and said wheel on said spindle in a manner identical to said first bearing member.

2. The wheel assembly as recited in claim 1, wherein said first and second locking projections are annular and concentrically encircle said spindle.

3. The wheel assembly as recited in claim 2, wherein each said first and second locking projection has thereon a radially inwardly projecting annular rib, said rib on said first locking projection having thereon a first annular surface which faces in said second axial direction and which is said third shoulder on said first locking projection, said rib on said second locking projection having thereon a second annular surface which faces in said first axial direction and which is said fourth shoulder on said second locking projection.

4. The wheel assembly as recited in claim 3, wherein said rib on said first locking projection has thereon a frustoconical surface which diverges in diameter in said first axial direction, and wherein said rib on said second locking projection has thereon a frustoconical surface which diverges in diameter in said second axial direction.

5. The wheel assembly as recited in claim 4, wherein said first bearing member has an annular further projection which projects from said one axial end into said central opening in said first axial direction and which concentrically encircles and is radially outwardly spaced from said first locking projection, said further projection having a radially outwardly facing surface which is said radially outwardly facing surface.

6. The wheel assembly as recited in claim 1, wherein said first bearing member includes a plurality of said first locking projections which are angularly spaced from each other.

7. The wheel assembly as recited in claim 6, wherein each said first locking projection has thereon a radially inwardly projecting rib which has thereon a respective portion of said third shoulder of said first locking projection.

8. The wheel assembly as recited in claim 6, including between each of said first locking projections a slot which extends completely axially through said bearing member.

9. The wheel assembly as recited in claim 8, wherein each said rib has thereon a frustoconical surface portion which diverges in diameter in said first axial direction.

10. The wheel assembly as recited in claim 9, wherein each said rib has at a radially inner end thereof a radially inwardly facing cylindrical surface which extends axially between said frustoconical surface portion thereon and said portion thereon of said third shoulder.

11. The wheel assembly as recited in claim 9, wherein said first bearing member includes a further annular projection which projects from said one axial end into said central opening in said first axial direction concentrically to said spindle and which is radially outwardly spaced from said first locking projections, said further projection having a radially outwardly facing surface which is said radially outwardly facing surface.

12. The wheel assembly as recited in claim 11, including a plurality of ribs which each extend radially between a respective said locking projection and said further projection, each said rib being located angularly intermediate opposite angular edges of a respective said locking projection.

13. The wheel assembly as recited in claim 12, wherein said locking projections, said further projection and said ribs are all integral parts of said bearing member.

14. The wheel assembly as recited in claim 1, wherein said wheel has in the region of said first and second axial ends thereof first and second surfaces which respectively face in said second and first axial directions; and wherein said bearing member and said further bearing member each have a said radially outwardly extending flange with an axially facing surface which engages a respective one of said first and second surfaces on said wheel to retain the wheel therebetween.

15. The wheel assembly as recited in claim 14, wherein said flanges are annular, said surfaces on said flanges are annular and continuous, and said first and second surfaces on said wheel are annular and continuous.

16. The wheel assembly as recited in claim 15, wherein said spindle has a central portion of reduced diameter, said first and third shoulders on said spindle being located at opposite axial ends of said central portion, and wherein said end portions of said spindle have reduced diameters.

17. The wheel assembly as recited in claim 14, wherein said spindle has end portions which project axially outwardly beyond said bearing members; and including two thread guards which are each supported on and extend radially outwardly from a respective said end portion of said spindle.

18. The wheel assembly as recited in claim 1, wherein said spindle is made of metal.

19. The wheel assembly as recited in claim 18, wherein said bearing member is made of a moldable synthetic resin material.

* * * * *